(12) United States Patent
Lim et al.

(10) Patent No.: US 11,804,155 B2
(45) Date of Patent: Oct. 31, 2023

(54) APPARATUS AND METHOD FOR DETERMINING A LOSS FUNCTION IN A STACKED DISPLAY DEVICE THEREOF

(71) Applicant: Samsung Electronics Co., Ltd., Suwon-si (KR)

(72) Inventors: Kyungmin Lim, Suwon-si (KR); Jaesung Lee, Suwon-si (KR); Bora Jin, Suwon-si (KR); Seyong Kwon, Suwon-si (KR); Daeyeong Kim, Suwon-si (KR); Sunil Lee, Suwon-si (KR); Kangwon Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/563,559

(22) Filed: Dec. 28, 2021

(65) Prior Publication Data

US 2022/0208042 A1    Jun. 30, 2022

Related U.S. Application Data

(63) Continuation of application No. PCT/KR2021/017990, filed on Dec. 1, 2021.

(30) Foreign Application Priority Data

Dec. 28, 2020    (KR) .......... 10-2020-0185195

(51) Int. Cl.
*G09G 3/30*    (2006.01)
*G09G 3/36*    (2006.01)
(Continued)

(52) U.S. Cl.
CPC ....... *G09G 3/003* (2013.01); *G02F 1/133514* (2013.01); *G02F 1/133607* (2021.01);
(Continued)

(58) Field of Classification Search
CPC .... G09G 3/003; G09G 3/36; G09G 2300/023; G09G 2340/12; G02F 1/133514; G02F 1/133607
See application file for complete search history.

(56) References Cited

U.S. PATENT DOCUMENTS 7,843,529 B2    11/2010  Ikeno et al.
8,154,799 B2    4/2012   Kim et al.
(Continued)

FOREIGN PATENT DOCUMENTS

KR    10-0592886 B1    6/2006
KR    10-2007-0103322 A    10/2007
(Continued)

OTHER PUBLICATIONS

International Search Report dated Mar. 3, 2022, issued in International Application No. PCT/KR2021/017990.
(Continued)

*Primary Examiner* — Sanghyuk Park
(74) *Attorney, Agent, or Firm* — Jefferson IP Law, LLP

(57) ABSTRACT

A stacked display device and a control method thereof are provided. The stacked display device includes a display including a plurality of display panels, and a processor processing a layer image for providing an image to the display, wherein the display includes a backlight irradiating a light, a first panel including a lens for diffusing the light irradiated from the backlight, and for displaying an image of a single color, a second panel stacked on the first panel, and including a color filter for displaying a color image, and a third panel stacked on the second panel, and for displaying an image of a single color.

13 Claims, 19 Drawing Sheets

(51) Int. Cl.
*G09G 3/00* (2006.01)
*G02F 1/1335* (2006.01)

(52) U.S. Cl.
CPC ......... *G09G 3/36* (2013.01); *G09G 2300/023* (2013.01); *G09G 2340/12* (2013.01)

(56) References Cited

U.S. PATENT DOCUMENTS

| | | | |
|---|---|---|---|
| 8,848,006 B2 | 9/2014 | Wetzstein et al. | |
| 9,343,020 B2 | 5/2016 | Heide et al. | |
| 2007/0242186 A1 | 10/2007 | Ikeno et al. | |
| 2010/0073768 A1 | 3/2010 | Kim et al. | |
| 2010/0118006 A1* | 5/2010 | Kimura | G09G 3/3611 348/673 |
| 2011/0032454 A1 | 2/2011 | Ikeno et al. | |
| 2014/0063077 A1* | 3/2014 | Wetzstein | G09G 3/36 345/102 |
| 2015/0035880 A1 | 2/2015 | Heide et al. | |
| 2015/0172641 A1 | 6/2015 | Nakamura et al. | |
| 2019/0122373 A1 | 4/2019 | Natroshvili et al. | |
| 2019/0243175 A1 | 8/2019 | Newton | |
| 2020/0154096 A1 | 5/2020 | Kim | |

FOREIGN PATENT DOCUMENTS

| | | |
|---|---|---|
| KR | 10-2009-0027056 A | 3/2009 |
| KR | 10-2010-0033067 A | 3/2010 |
| WO | 2019-221993 A1 | 11/2019 |
| WO | 2020/056408 A1 | 3/2020 |

OTHER PUBLICATIONS

MIT; Open Access Article; Tensor Displays: Compressive Light Field Synthesis using Multilayer Displays with Directional Backlighting, ACM Transactions on Graphics, vol. 31, Issue 4, Jul. 1, 2012.

European Search Report dated Jul. 13, 2023; European Appln. No. 21915553.8-1208/4184916 PCT/KR2021017990.

\* cited by examiner

APPARATUS AND METHOD FOR DETERMINING A LOSS FUNCTION IN A STACKED DISPLAY DEVICE THEREOF

CROSS-REFERENCE TO RELATED APPLICATION(S)

This application is a continuation application, claiming priority under § 365(c), of an International application No. PCT/KR2021/017990, filed on Dec. 1, 2021, which is based on and claims the benefit of a Korean patent application number 10-2020-0185195, filed on Dec. 28, 2020, in the Korean Intellectual Property Office, the disclosure of which is incorporated by reference herein in its entirety.

TECHNICAL FIELD

The disclosure relates to a stacked display device and a control method thereof. More particularly, the disclosure relates to a stacked display device wherein a monochrome panel and a color panel are combined, and a control method thereof.

BACKGROUND ART

In the past, for expressing a stereoscopic effect of an image, a method of displaying an image by using a stacked display device was suggested. A stacked display device may be implemented as two or more display panels are stacked, and an image may be displayed on each of the two or more display panels, and an image to which a three-dimensional depth is reflected can be provided.

However, in the case of a stacked display device according to the related art wherein color panels including color filters are stacked, a problem that the resolution is deteriorated due to the plurality of color filters could occur.

In addition, in case a lens is further added on a monochrome panel, an image of which viewing angle has been improved can be provided. However, in the past, an image was provided through layer stack images for which an optical property due to a lens was not considered, and thus a problem that the image quality is reduced could occur.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a stacked display device including a color panel including a color filter and a monochrome panel not including a color filter. Further, the disclosure suggests a method of acquiring layer stack images for which an optical property of a lens is considered.

Additional aspects will be set forth in part in the description which follows and, in part, will be apparent from the description, or may be learned by practice of the presented embodiments.

Technical Solution

In accordance with an aspect of the disclosure, a stacked display device is provided. The stacked display device includes a display including a plurality of display panels, and a processor processing a layer image for providing an image to the display, wherein the display includes a backlight irradiating a light, a first panel including a lens for diffusing the light irradiated from the backlight, and for displaying an image of a single color, a second panel stacked on the first panel, and including a color filter for displaying a color image, and a third panel stacked on the second panel, and for displaying an image of a single color.

Moreover, the second panel may be a color panel including the color filter, and the first panel and the third panel may be monochrome panels not including a color filter.

In addition, the lens may be a multi-array lens, and an image provided to a user may be different according to the view of the user viewing the stacked display device by the multi-array lens.

Further, the processor may acquire a first layer image for displaying an image on the first panel, a second layer image for displaying an image on the second panel, and a third layer image for displaying an image on the third panel, and control the display to, while displaying the first layer image on the first panel, display the second layer image on the second panel, and display the third layer image on the third panel.

In addition, the processor may acquire first light field (LF) images of different views, and input the first LF images into a factorization model for converting an LF image into a layer image, and acquire the first layer image, the second layer image, and the third layer image.

In addition, the processor may compare second LF images restored based on the first layer image, the second layer image, and the third layer image with the first LF images and acquire a loss function, and train the factorization model based on the loss function.

Further, the second LF images may be a collection of a plurality of images corresponding to a plurality of views, and the processor may convert the first layer image to correspond to a first view and acquire a 1-1 view layer image, and restore an image corresponding to the first view among the second LF images based on the 1-1 view layer image, the second layer image, and the third layer image.

In addition, the processor may acquire first LF images of different views, and input the first LF images into the factorization model for converting an LF image into a layer image, and acquire the second layer image, the third layer image, and a plurality of first view layer images corresponding to a plurality of views.

In addition, the processor may restore the second LF images based on the plurality of respective first view layer images corresponding to the plurality of views, the second layer image, and the third layer image, compare the restored second LF images with the first LF images and acquire a loss function, and train the factorization model based on the loss function.

Further, the first layer image and the third layer image may be images of a single color, and the second layer image may be a color image.

In accordance with another aspect of the disclosure, a method of controlling a stacked display device is provided. The method includes the steps of acquiring first LF images of different views, inputting the first LF images into a factorization model for converting an LF image into a layer image, and acquiring a first layer image, a second layer image, and a third layer image, acquiring second LF images restored based on the first layer image, the second layer image, and the third layer image, comparing the first LF images with the second LF images and acquiring a loss function, and training the factorization model based on the loss function.

Moreover, the stacked display device may include a first panel, a second panel, and a third panel, and the first layer image may be an image for being displayed on the first panel, the second layer image may be an image for being displayed on the second panel, and the third layer image may be an image for being displayed on the third panel.

In addition, on the first panel, a multi-array lens for diffusing a light may be arranged, and an image provided to a user may be different according to the view of the user viewing the stacked display device by the multi-array lens.

Further, the second LF images may be a collection of a plurality of images corresponding to a plurality of views, and the step of acquiring the second LF images may include the steps of converting the first layer image to correspond to a first view and acquiring a 1-1 view layer image, and restoring an LF image corresponding to the first view among the second LF images based on the second layer image, the third layer image, and the 1-1 view layer image.

In addition, the step of converting the first layer image to correspond to the first view may be the step of enlarging a pixel area corresponding to the first view among the pixel areas of the first layer image as much as the pitch of the multi-array lens and acquiring the 1-1 view layer image corresponding to the first view.

In addition, the step of acquiring the third layer image may be the step of inputting the first LF images into a factorization model for converting an LF image into a layer image, and acquiring the second layer image, the third layer image, and a plurality of first view layer images corresponding to a plurality of views.

Further, the step of acquiring the second LF images may be the step of acquiring the second LF images based on the second layer image, the third layer image, and a plurality of 1-1 view layer images corresponding to a plurality of views.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
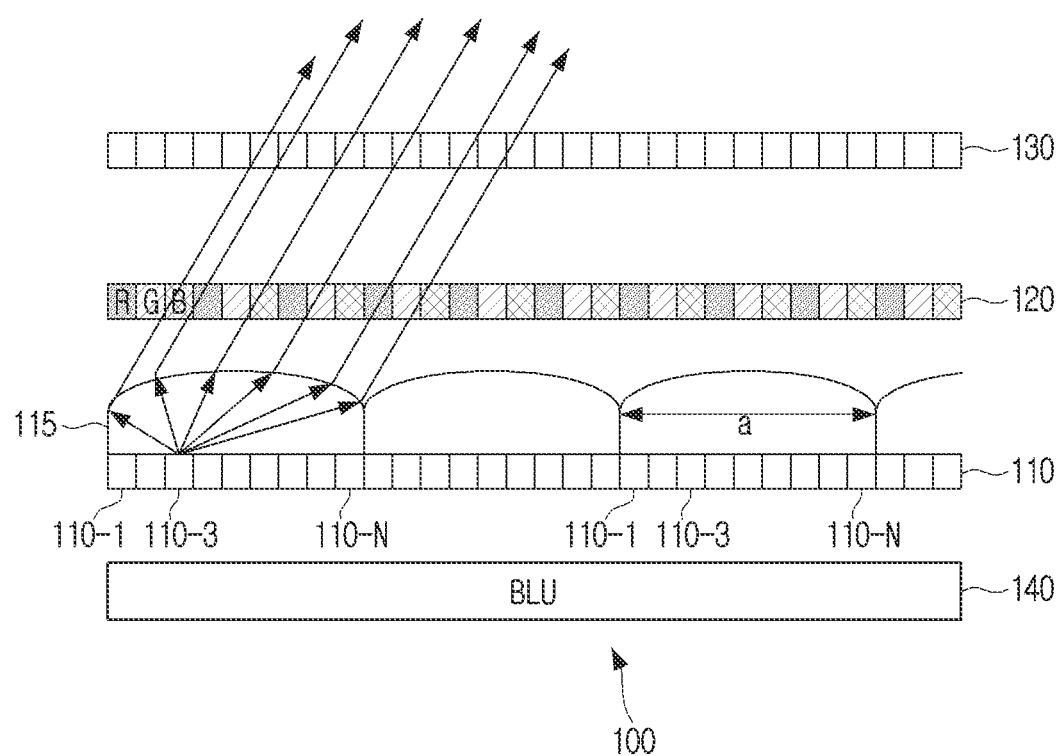
FIG. 1 is a diagram for illustrating a stacked display 100 of a stacked display device according to an embodiment of the disclosure.

FIG. 1 is a diagram for illustrating a stacked display of a stacked display device according to an embodiment of the disclosure.

First, referring to FIG. 1, a stacked display 100 of the stacked display device may include a first panel 110, a second panel 120, a third panel 130, and a backlight 140.

Referring to FIG. 1, the first panel 110 may be stacked on the backlight 140, and the second panel 120 may be stacked on the first panel 110. Moreover, the third panel 130 may be stacked on the second panel 120.

The backlight 140 is a component for irradiating a light on a display panel. For example, each of the first panel 110, the second panel 120, and the third panel 130 may be sequentially stacked on the backlight 140 of the stacked display 100, and the backlight 140 may irradiate a light to each panel. In case the stacked display 100 includes the backlight 140 as in FIG. 1, each of the first panel 110, the second panel 120, and the third panel 130 may be implemented as a liquid crystal display (LCD) panel.

Referring to FIG. 1, it is described that the stacked display 100 includes the backlight 140, but the disclosure is not limited thereto. As an example, the stacked display 100 may not include the backlight 140, and each panel of the stacked display 100 may be implemented as an organic light emitting diodes (OLED) panel, and a light may be irradiated from each organic light emitting diodes (OLED) panel itself. For example, each of the first panel 110, the second panel 120, and the third panel 130 according to an embodiment of the disclosure may be implemented as various displays such as OLED, LCD, ultra-light emitting diodes (uLED), Micro LED, and transparent displays.

In addition, each panel of the stacked display 100 may further include a polarizing plate, although not illustrated in FIG. 1.

According to an embodiment of the disclosure, a layer image may be displayed on each panel, and a stereoscopic image may be provided. For example, the stacked display device may control the stacked display 100 to, while displaying a first layer image on the first panel 110, display a second layer image on the second panel 120, and display a third layer image on the third panel 130. As an example, a plurality of LF images of different views may be input into a factorization model, and the first layer image, the second image, and the third layer image may be acquired.

The factorization model is a model for converting a plurality of light field (LF) images into layer images for being displayed on the stacked display 100 of the stacked display device. The light field (LF) images means a collection of a plurality of images wherein at least one object is photographed in different views through an LF camera. As an example, the factorization model may be implemented as one of a deep neural network (DNN) model, a non-negative tensor factorization (NTF) model, and a non-negative matric factorization (NMF) model.

As an example, in case the number of the panels of the stacked display 100 is three, a plurality of LF images may be converted into three layer images through the factorization model. The plurality of LF images that were acquired as at least one object was photographed in different views through the LF camera may be converted into a plurality of layer images corresponding to the number of the panels of the stacked display 100 through the factorization model. A detailed content regarding the factorization model will be described through the drawings below.

In the case of a stacked display device according to the related art, only panels including a color filter were used, and in this case, a problem of loss of the resolution could occur. For example, in a stacked display device according to the related art consisting of a lower panel and an upper panel including a red, green, and blue (RGB) color filter, in case a lens for diffusing a viewing angle is attached on the lower panel, a light source that passed through the RED pixels of the lower panel cannot pass through the green and blue pixels in the upper panel. Due to such a characteristic, a problem that the resolution of an image provided by the stacked display device was reduced to ⅓ could occur.

Accordingly, the disclosure is aimed at addressing the issue of reduction of a resolution of an image provided by a stacked display device by combining at least one monochrome panel and one color panel.

According to an embodiment of the disclosure, the first panel 110 and the third panel 130 may be monochrome panels, and the second panel 120 may be a color panel. For example, the first panel 110 and the third panel 130 may be monochrome panels not including a color filter, and for displaying an image of a single color. Moreover, the second panel 120 may be a color panel including a color filter, and for displaying a color image.

A monochrome panel may not include a color filter, and a layer image displayed on a monochrome panel may be a layer image for expressing only a contrast ratio. As an example, a monochrome panel may display a layer image consisting of a single color of black and white, and in this case, a contrast ratio may be expressed through pixel values in the layer image.

A color panel may include a color filter, and a color panel may include a pixel expressing a first color, a pixel expressing a second color, and a pixel expressing a third color by a color filter. In addition, the first color, the second color, and the third color may be combined, and colors may be expressed. As an example, pixels of a color panel may be implemented as pixels having three colors of red, green, and blue (RGB) by a color filter.

Further, the first panel 110 which is a monochrome panel may be stacked on the backlight 140. For example, a light irradiated from the backlight 140 may be introduced into the lower area of the first panel 110.

In addition, the second panel 120 which is a color panel may be stacked on the first panel 110. For example, a light irradiated from the backlight 140 may pass through the first panel 110, and the light that passed through the first panel 110 may be introduced into the lower area of the second panel 120.

In addition, the third panel 130 which is a monochrome panel may be stacked on the second panel 120. For example, a light irradiated from the backlight 140 may pass through the first panel 110 and the second panel 120, and the light that passed through the second panel 120 may be introduced into the lower area of the third panel 130.

Moreover, according to an embodiment of the disclosure, the first panel 110 may include a lens for improving a viewing angle. As an example, a lens may be implemented as a multi-array lens. A multi-array lens 115 is a component for diffusing a light that passes through one pixel as much as the pitch of the multi-array lens. A multi-array lens 115 may be implemented as, for example, a lenticular lens, a lenslet array, or the like, but the disclosure is not limited thereto, and a multi-array lens 115 may be implemented as various lenses for diffusing a light.

Referring to FIG. 1, the multi-array lens 115 may consist of a plurality of lenses having a length of a specific pitch a, and the pitch a of one lens may have a length from the first pixel 110-1 to the $N^{th}$ pixel 110-N of the panel. In this case, the one lens may be stacked on a pixel area corresponding to the first pixel 110-1 to the Nth pixel 110-N in the first panel 110. Here, the first pixel 110-1 to the Nth pixel 110-N may be pixels that are sequentially arranged in a horizontal direction.

However, the disclosure is not limited thereto, and the first pixel to the Nth pixel may be arranged in a vertical direction. Alternatively, the first pixel to the Nth pixel may consist of pixels in horizontal and vertical directions, i.e., from a (1, 1) pixel to a (N, N) pixel.

In addition, as an example, in case a user views the stacked display device from a first view, the user may view only a light that passed through a pixel area corresponding to the first pixel 110-1 among the plurality of pixels of the first panel 110. In addition, as in FIG. 1, in case a user views the stacked display device from a third view, the user may view only a light that passed through a pixel area corresponding to the third pixel 110-3 among the plurality of pixels of the first panel 110. Further, in case a user views the stacked display device from an Nth view, the user may view only a light that passed through a pixel area corresponding to the Nth pixel 110-N among the plurality of pixels of the first panel 110.

For example, each of the plurality of lenses may be stacked on each of the pixel areas corresponding to the first pixel 110-1 to the Nth pixel 110-N, and in case a user views the stacked display device from the first view, only a light that passed through a pixel area corresponding to the first pixel 110-1 in each of the plurality of lenses may be provided to the user. By using such an optical property of a multi-array lens, a user may view different images in the first view to the Nth view through a layer stack.

Accordingly, in a first layer image displaying an image on the first panel 110 to which the multi-array lens 115 is attached, a layer image may be generated in the pixels corresponding to the first pixel 110-1 as if the image is viewed in the first view. Moreover, in the pixels corresponding to the Nth pixel 110-N in the first layer image, a layer image may be generated as if the image is viewed in the Nth view. For example, the first layer image acquired through a factorization model according to an embodiment of the disclosure may be an image rendered so as to be viewed in different views for each pixel corresponding to each of a user's views. A detailed content in this regard will be described later through the drawings below.

In addition, a second layer image displayed on the second panel 120 may be a color layer image consisting of three colors of RGB, and the first layer image displayed on the first panel 110 and a third layer image displayed on the third panel 130 may be layer images of a single color that can express only a contrast.

For example, through the factorization model according to an embodiment of the disclosure, the first layer image and the third layer image which are images of a single color may be acquired, and the second layer image which is a color image may be acquired in LF images.

In the aforementioned embodiment, it was described that a color panel is arranged between monochrome panels, but the disclosure is not limited thereto. For example, the disclosure may be implemented such that a color panel is arranged in the upper part of the backlight 140, and two monochrome panels are arranged on the color panel. In addition, the disclosure may be implemented such that two monochrome panels are respectively stacked in the upper part of the backlight 140, and a color panel is arranged in the uppermost part.

Moreover, in the aforementioned embodiment, it was described that a lens is attached to the first panel 110 stacked in the upper part of the backlight 140, but the disclosure is not limited thereto. For example, a lens may be attached to the second panel 120 or the third panel 130.

In addition, in the aforementioned embodiment, only the stacked display 100 including three panels was described, but the disclosure is not limited thereto. For example, the stacked display 100 may include only one color panel and one monochrome panel, and also, the stacked display 100 may include one color panel and two or more monochrome panels.

Figure 2:
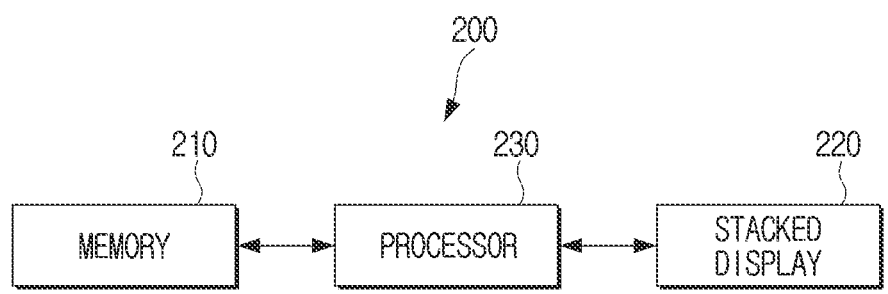
FIG. 2 is a block diagram illustrating a configuration of a stacked display device according to an embodiment of the disclosure.

FIG. 2 is a block diagram illustrating a configuration of a stacked display device according to an embodiment of the disclosure.

Referring to FIG. 2, a stacked display device 200 may include a memory 210, a stacked display 220, and a processor 230. The stacked display device 200 according to an embodiment of the disclosure may be implemented as a device providing a stereoscopic image as it includes a plurality of display panels.

The memory 210 may store various kinds of programs and data necessary for the operations of the stacked display device 200. Specifically, in the memory 210, at least one instruction may be stored. The processor 230 may perform the operations of the stacked display device 200 by executing the instructions stored in the memory 210.

Specifically, the memory 210 may store instructions or data related to at least one other component of the stacked display device 200. More particularly, the memory 210 may be implemented as a non-volatile memory, a volatile memory, a flash-memory, a hard disc drive (HDD), or a solid state drive (SSD), or the like. In addition, the memory 210 may be accessed by the processor 230, and reading/recording/correcting/deleting/updating, or the like, of data by the processor 230 may be performed. In the disclosure, the term memory may include a memory 210, a read only memory (ROM) (not shown) and a random access memory (RAM) (not shown) inside the processor 230, or a memory card (not shown) (e.g., a micro secure digital (SD) card, a memory stick, or the like) mounted on the stacked display device 200.

According to an embodiment of the disclosure, the stacked display 220 may be implemented as the stacked display 100 including the backlight 140 and the plurality of panels 110 to 130 stacked on the backlight 140 as illustrated in FIG. 1. However, the disclosure is not limited thereto, and as will be described below in FIGS. 5A to 5E, the stacked display 220 may be implemented in various forms.

Moreover, in case the stacked display 100 includes the backlight 140, each of the plurality of panels may be implemented as a liquid crystal display (LCD) panel.

According to an embodiment of the disclosure, each of the plurality of panels of the stacked display 220 may be implemented as an organic light emitting diodes (OLED) panel, and implemented to irradiate a light from each organic light emitting diodes (OLED) panel itself. In this case, the stacked display 220 may not include a backlight.

In addition, according to an embodiment of the disclosure, the stacked display 220 may include the first panel 110, the second panel 120, the third panel 130, and the backlight 140 as in FIG. 1. In addition, the second panel 120 may be implemented as a color panel including a color filter, and the first panel 110 and the third panel 130 may be implemented as monochrome panels not including a color filter. However, the disclosure is not limited thereto, and the stacked display 220 according to an embodiment of the disclosure may be implemented as the second panel 120 which is a color panel and the first panel 110 which is a monochrome panel, and include only the two panels.

In case the stacked display 220 according to an embodiment of the disclosure is implemented as the stacked display 100 in FIG. 1, the first panel 110, the second panel 120, and the third panel 130 may have a structure wherein they are arranged to be in parallel with one another, and are stacked in a direction perpendicular to the surface. Moreover, the second panel 120 may be stacked on the first panel 110, and the third panel 130 may be stacked on the second panel 120. For example, the third panel 130 may be arranged in the lower part (or the rear surface direction) of the first panel 110 and the second panel 120, and the first panel 110 may be arranged in the upper part (or the upper surface direction) of the second panel 120 and the third panel 130, and the second panel 120 may be arranged between the first panel 110 and the third panel 130. Further, the first panel 110 may be a color panel including a color filter, and the second panel 120 and the third panel 130 may be monochrome panels not including a color filter.

For example, the first panel 110 which is a monochrome panel may be stacked on the backlight 140. Specifically, a light irradiated from the backlight 140 may be introduced into the lower area of the first panel 110. In addition, the second panel 120 which is a color panel may be stacked on the first panel 110. For example, a light irradiated from the backlight 140 may pass through the first panel 110, and the light that passed through the first panel 110 may be introduced into the lower area of the second panel 120.

Further, the third panel 130 which is a monochrome panel may be stacked on the second panel 120. For example, a light irradiated from the backlight 140 may pass through the first panel 110 and the second panel 120, and the light that passed through the second panel 120 may be introduced into the lower area of the third panel 130.

In addition, according to an embodiment of the disclosure, the first panel 110 may include a lens for improving a viewing angle. As an example, the lens may be implemented as a multi-array lens. A multi-array lens is a component for diffusing a light that passes through one pixel as much as the pitch of the multi-array lens. For example, by a multi-array lens, an image provided to a user may be different according to the user's view viewing the stacked display device 200, and a detailed content in this regard will be described below through FIGS. 5A and 5B.

A multi-array lens may be implemented as, for example, a lenticular lens, a lenslet array, or the like, but the disclosure is not limited thereto, and a multi-array lens may be implemented as various lenses for diffusing a light.

A monochrome panel may not include a color filter, and a layer image displayed on a monochrome panel may be a layer image for expressing only a contrast ratio. As an example, a monochrome panel may display a layer image consisting of a single color of black and white, and in this case, a contrast ratio may be expressed through pixel values in the layer image.

A color panel may include a color filter, and a color panel may include a pixel expressing a first color, a pixel expressing a second color, and a pixel expressing a third color by a color filter. In addition, the first color, the second color, and the third color may be combined, and colors may be expressed. As an example, pixels of a color panel may be implemented as pixels having three colors of red, green, and blue (RGB) by a color filter.

According to an embodiment of the disclosure, the second layer image displayed on the second panel 120 which is a color panel may be a color layer image consisting of three colors of RGB, and the first layer image 10 displayed on the first panel 110 and the third layer image 30 displayed on the third panel 130 may be layer images of a single color that can express only a contrast.

Functions related to artificial intelligence according to an embodiment of the disclosure are operated through the processor 230 and the memory 210.

The processor 230 may consist of one or a plurality of processors. Here, the one or plurality of processors may be generic-purpose processors such as a central processing unit (CPU), an application processor (AP), or the like, graphics-dedicated processors such as a graphics processing unit (GPU), a visual processing unit (VPU), or the like, or artificial intelligence-dedicated processors such as a neural processing unit (NPU), or the like.

The one or plurality of processors perform control to process input data according to predefined operation rules or an artificial intelligence model stored in the memory. The predefined operation rules or the artificial intelligence model are characterized in that they are made through learning. Here, being made through learning means that a learning algorithm is applied to a plurality of learning data, and predefined operation rules or an artificial intelligence model having a desired characteristic is made. Such learning may be performed in a device itself wherein artificial intelligence is performed according to an embodiment of the disclosure, or performed through a separate server/system.

An artificial intelligence model may consist of a plurality of neural network layers. Each layer has a plurality of weight values, and performs an operation of the layer through an operation between the operation result of the previous layer and the plurality of weight values. As examples of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks, but the neural network in the disclosure is not limited to the aforementioned examples excluding specified cases.

The processor 230 may be electronically connected with the memory 210 and control the overall operations and functions of the stacked display device 200.

As an example, in case the stacked display 220 is implemented as a display including three panels like the stacked display 100 in FIG. 1, the processor 230 may execute at least one instruction stored in the memory 210, and thereby acquire the first layer image for displaying an image on the first panel 110, the second layer image for displaying an image on the second panel 120, and the third layer image for displaying an image on the third panel 130. Here, the second layer image may be an image that can display colors as three colors of red, green, and blue (RGB) are combined. In addition, the first layer image and the third layer image may be images consisting of a single color of black and white. In addition, the first layer image to the third layer image may be acquired by factorizing LF images of different views.

As an example, in case the stacked display 220 is implemented as a display including three panels of the first panel, the second panel, and the third panel, the processor 230 may execute at least one instruction stored in the memory 210, and thereby acquire the first layer image for displaying an image on the first panel 110, the second layer image for displaying an image on the second panel 120, and the third layer image for displaying an image on the third panel 130. Here, the first layer image may be an image that can display colors as three colors of red, green, and blue (RGB) are combined. In addition, the second layer image and the third layer image may be images consisting of a single color of black and white. In addition, the first layer image to the third layer image may be acquired by factorizing LF images of different views.

Then, the processor 230 may control the stacked display to, while displaying the first layer image on the first panel 110, display the second layer image on the second panel 120, and display the third layer image on the third panel 130, and thereby provide a stereoscopic image.

According to an embodiment of the disclosure, for providing an image to the stacked display 220 including three panels, the processor 230 may input first LF images into the factorization model for converting LF images into layer stacks, and thereby acquire three layer images.

For example, the processor 230 may acquire the first layer image, the second layer image, and the third layer image through the factorization model.

The performance of the factorization model according to an embodiment of the disclosure may be improved through a learning process. For example, a plurality of layer images acquired from the factorization model may be restored in an LF image format (a simulation process), and the restored LF images may be compared with the first LF images and a loss function may be acquired, and the factorization model may be trained based on the loss function.

Specifically, the processor 230 may compare the second LF images restored based on the first layer image, the second layer image, and the third layer image with the first LF images and acquire a loss function, and train the factorization model based on the loss function. Here, the second LF images may also be a collection of a plurality of images corresponding to a plurality of views like the first LF images.

According to an embodiment of the disclosure, the processor 230 may convert the first layer image for being displayed on the first panel among the plurality of layer images acquired from the factorization model to correspond to each of a plurality of views of LF images. Then, the processor 230 may go through a simulation process of the first layer image converted according to the plurality of views together with the second layer image and the third layer image, and thereby acquire the second LF images.

Such a learning process of the factorization model will be described in detail through FIGS. 8 and 9.

Meanwhile, the stacked display device 200 may further include at least one of various components such as a communicator, an input interface, or the like.

The communicator may perform communication with an external device, and transmit or receive data with the external device. For example, the communicator may perform wireless communication by at least one of various methods such as cellular communication using at least one of LTE, LTE Advance (LTE-A), code division multiple access (CDMA), wideband CDMA (WCDMA), a universal mobile telecommunications system (UMTS), Wireless Broadband (WiBro), or a Global System for Mobile Communications (GSM), or the like, and wireless fidelity (Wi-Fi), Bluetooth, Bluetooth low energy (BLE), Zigbee, near field communication (NFC), or the like. In addition, the communicator may perform wired communication by at least one of various methods such as a universal serial bus (USB), a high definition multimedia interface (HDMI), a digital visual interface (DVI), a Thunderbolt, an Ethernet, a USB port, lightning, or the like.

The input interface may receive user commands in various methods from a user. The input interface may transmit a received user command to the processor 230. For this, the input interface may include, for example, a touch panel or keys. The touch panel may use, for example, at least one method among a capacitive method, a resistive method, an infrared method, or an ultrasonic method, and include a control circuit for this. The touch panel may further include a tactile layer, and provide a tactile response to a user. The keys may be implemented, for example, through a physical button method, an optical method, or a virtual keypad method combined with the touch panel.

Figure 3A:
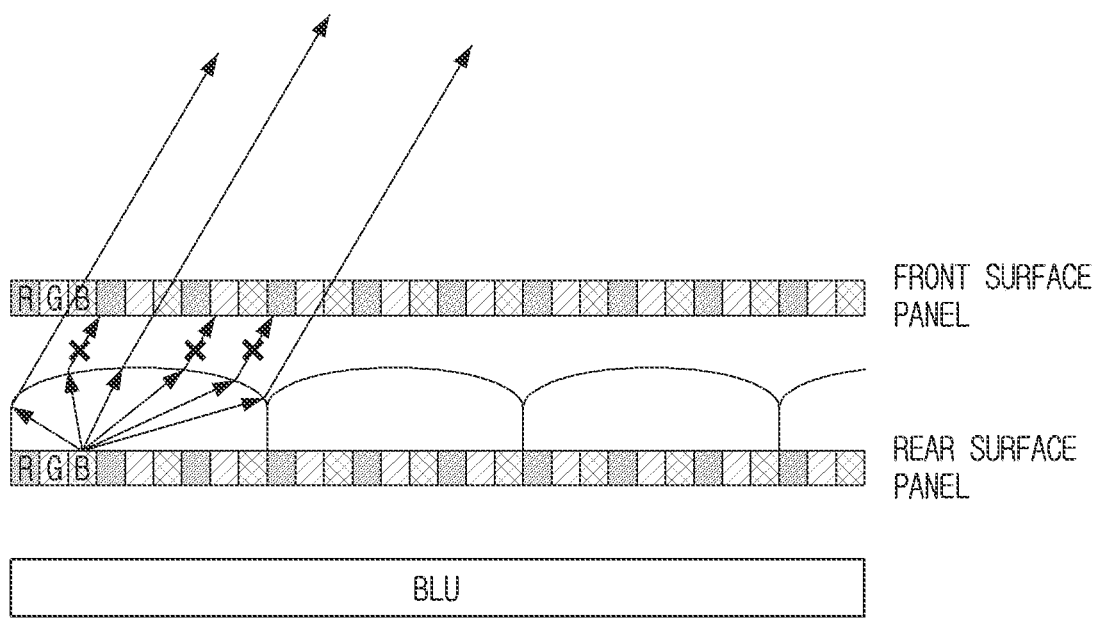
FIG. 3A is a diagram illustrating a stacked display including only a color panel according to an embodiment of the disclosure.

FIG. 3A is a diagram illustrating a stacked display including only a color panel according to an embodiment of the disclosure. Moreover, FIG. 3B is a diagram for illustrating an observation point of view observed through a rear surface panel and a front surface panel of a stacked display in FIG. 3A according to an embodiment of the disclosure.

Figure 3B:
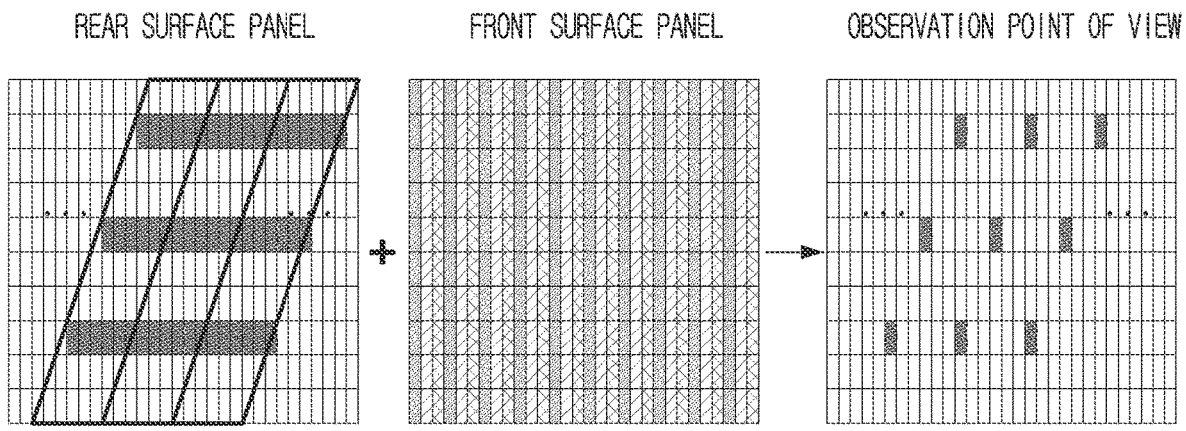
FIG. 3B is a diagram for illustrating an observation point of view observed through a rear surface panel and a front surface panel of a stacked display in FIG. 3A according to an embodiment of the disclosure.

Referring to FIGS. 3A and 3B, in the past, in the case of a stacked display implemented as a plurality of color panels as in FIG. 3A, a problem that the resolution is reduced could occur. For example, in case a lens for diffusing a viewing angle is attached on a rear surface panel including a color panel consisting of three colors as in FIG. 3A, a light source that passed through a pixel for a first color in the lower panel cannot pass through pixels for the second color and the third color in the front surface panel. Due to such a characteristic, a problem that an observation point of view observed through the rear surface panel and the front surface panel is observed while the resolution is reduced to ⅓ compared to the resolution of the image that was originally aimed to be provided by the stacked display could occur, as in FIG. 3B. Accordingly, the disclosure suggests a stacked display wherein a monochrome panel and a color panel are combined, as in FIG. 4A.

Figure 4A:
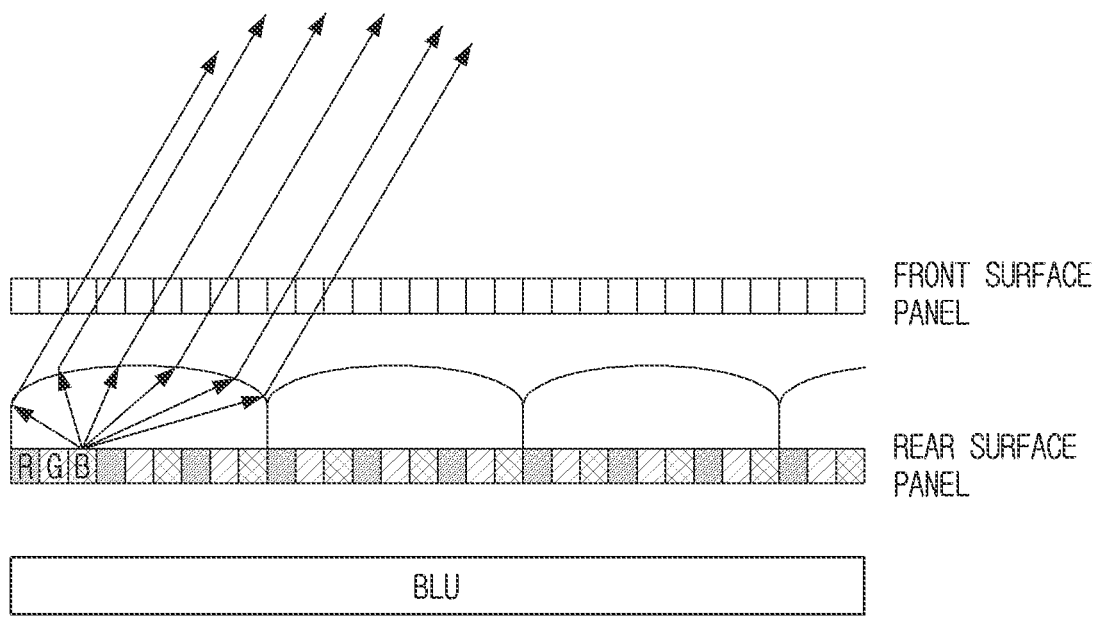
FIG. 4A is a diagram illustrating a stacked display including a monochrome panel and a color panel according to an embodiment of the disclosure.

FIG. 4A is a diagram illustrating a stacked display including a monochrome panel and a color panel according to an embodiment of the disclosure. In addition, FIG. 4B is a diagram for illustrating an observation point of view observed through a rear surface panel and a front surface panel of a stacked display in FIG. 4A according to an embodiment of the disclosure.

Figure 4B:
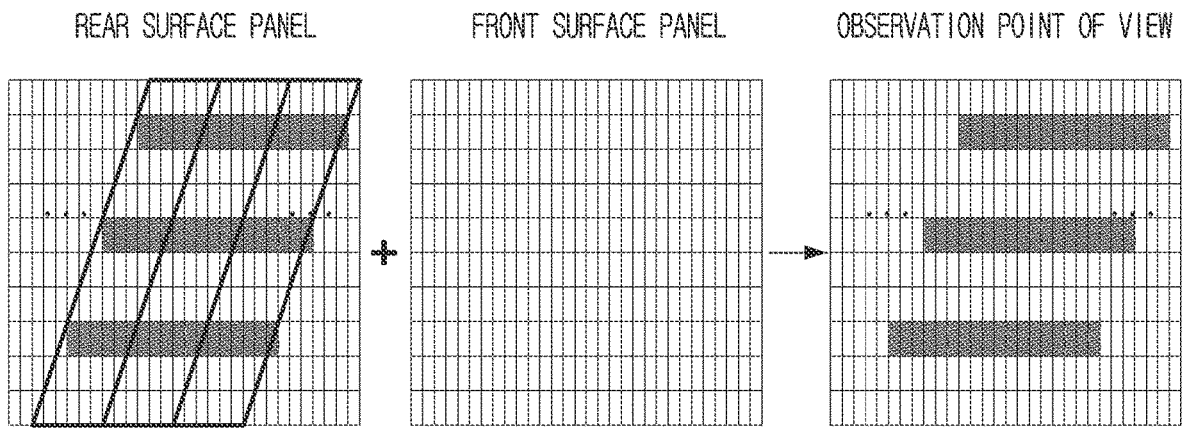
FIG. 4B is a diagram for illustrating an observation point of view observed through a rear surface panel and a front surface panel of a stacked display in FIG. 4A according to an embodiment of the disclosure.

Referring to FIGS. 4A and 4B, in case a lens for diffusing a viewing angle is attached on a rear surface panel including a color panel consisting of three colors, and a front surface panel is implemented as a monochrome panel as in FIG. 4A, a light source that passed through a pixel for the first color in the lower panel may pass through all pixels of the front surface panel. By such a characteristic, an observation point of view observed through the rear surface panel and the front surface panel may be observed according to the resolution of the image that was originally aimed to be provided by the stacked display, as in FIG. 4B.

Figure 5A:
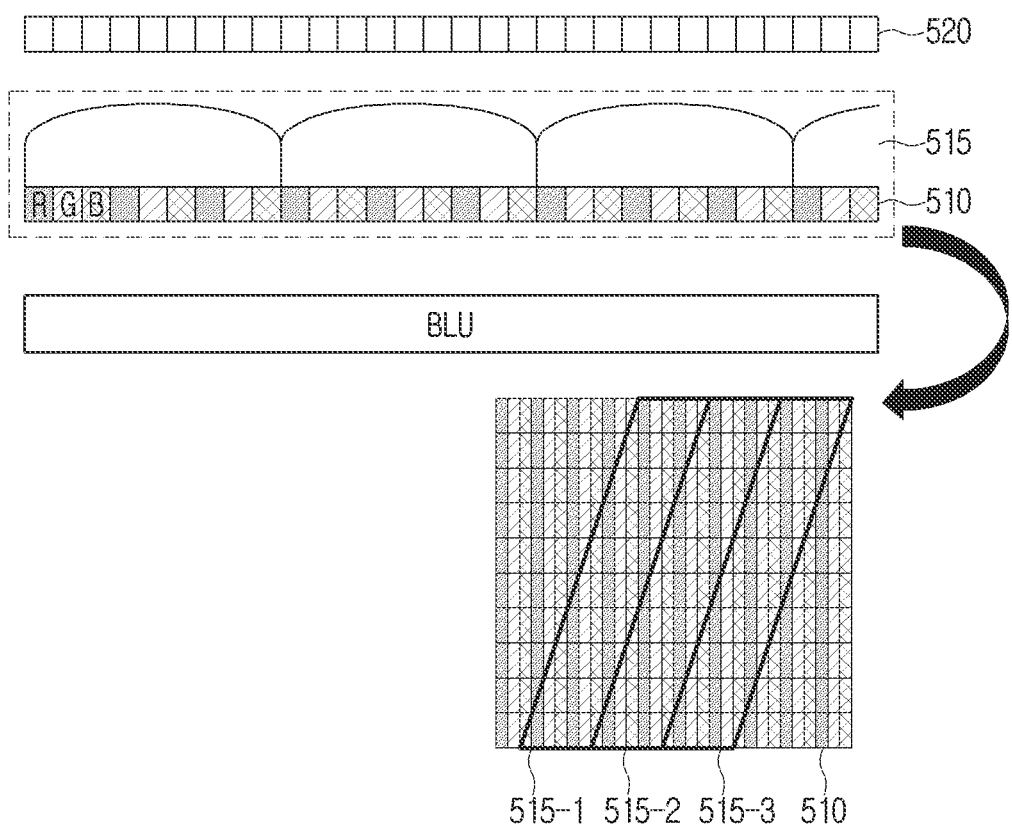
FIG. 5A is a front view of a rear surface panel to which a multi-array lens is attached according to an embodiment of the disclosure.

FIG. 5A is a front view of a rear surface panel to which a multi-array lens is attached according to an embodiment of the disclosure.

Referring to FIG. 5A, the multi-array lens 515 according to an embodiment of the disclosure may be arranged on the rear surface panel 510. In addition, the multi-array lens 515 may consist of a plurality of unit lenses 515-1, 515-2, 515-3. A unit lens refers to an optical element for refracting a light and changing the proceeding direction of the light. For this, each of the plurality of unit lenses 515-1, 515-2, 515-3 may have various shapes such as a semi-cylindrical shape, a hemisphere shape, or the like, and they may be implemented in various materials such as glass having a transparent property, a plastic resin, polyimide, or the like.

In addition, each of the unit lenses 515-1, 515-2, 515-3 of the multi-array lens 515 may be arranged on the rear surface panel 510 so as to be located on each of the plurality of pixels of the rear surface panel 510. For example, the plurality of unit lenses 515-1, 515-2, 515-3 may be arranged on the rear surface panel 510 so as to cover the plurality of pixels of the rear surface panel 510.

Further, according to an embodiment of the disclosure, the unit lenses 515-1, 515-2, 515-3 may be arranged slantly with respect to the plurality of pixels of the rear surface panel 510 as in FIG. 5A. For example, the pixel area corresponding to the first pixel 110-1 in FIG. 1 may be identical to the area corresponding to the first pixel 510-1 in FIG. 5B.

Figure 5B:
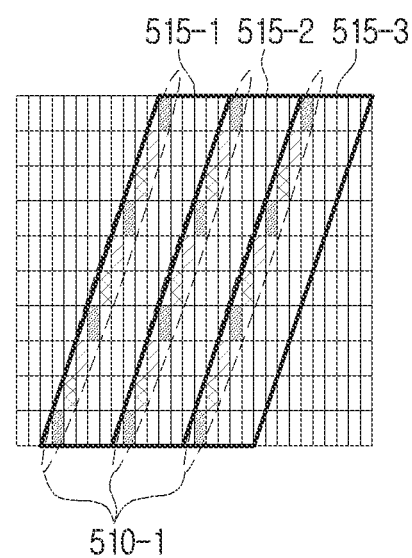
FIG. 5B is a diagram illustrating pixel areas of a rear surface panel that is observed when viewing a stacked display from a first view according to an embodiment of the disclosure.

FIG. 5B is a diagram illustrating pixel areas of a rear surface panel that is observed when viewing a stacked display from a first view according to an embodiment of the disclosure.

Figure 5C:
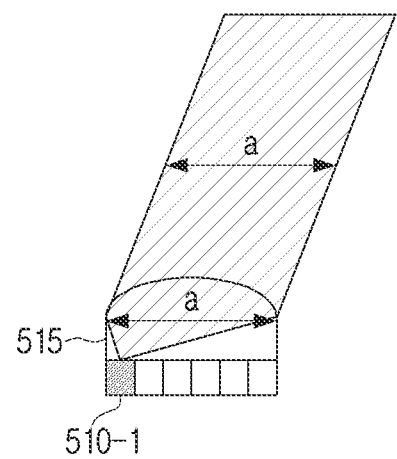
FIG. 5C is a diagram illustrating a proceeding direction of a light source that is observed when viewing a stacked display from a first view according to an embodiment of the disclosure.

FIG. 5C is a diagram illustrating a proceeding direction of a light source that is observed when viewing a stacked display from a first view according to an embodiment of the disclosure.

Figure 5D:
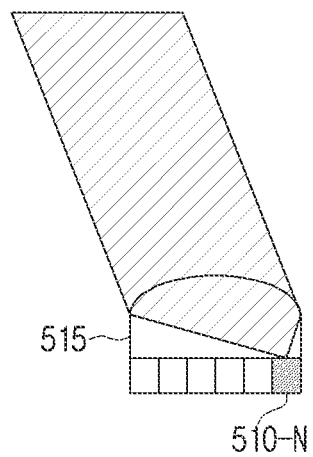
FIG. 5D is a diagram illustrating a proceeding direction of a light source that is observed when viewing a stacked display from an Nth view according to an embodiment of the disclosure.

FIG. 5D is a diagram illustrating a proceeding direction of a light source that is observed when viewing a stacked display from an Nth view according to an embodiment of the disclosure.

Referring to FIGS. 5B to 5D, according to an embodiment of the disclosure, in case a user views the stacked display device in the first view, the user may view only a light that passed through a pixel area corresponding to the first pixel 510-1 among the plurality of pixels of the rear surface panel 510. For example, in case a user views the stacked display device in the first view, only a light that passed through a pixel area corresponding to the first pixel 510-1 may be diffused as much as the pitch a of the multi-array lens 515 and provided to the user, as in FIG. 5C.

In addition, in case a user views the stacked display device in the Nth view, the user may view only a light that passed through a pixel area corresponding to the Nth pixel 510-N among the plurality of pixels of the rear surface panel 510, as in FIG. 5D.

Figure 5E:
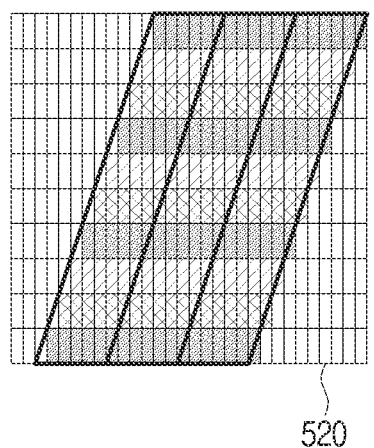
FIG. 5E is a diagram illustrating pixel areas of a front surface panel that is observed when viewing a stacked display from a first view according to an embodiment of the disclosure.

FIG. 5E is a diagram illustrating pixel areas of a front surface panel that is observed when viewing a stacked display from a first view according to an embodiment of the disclosure.

Referring to FIG. 5E, in the case of viewing the stacked display in the first view, a light that passed through the first pixel 510-1 of the rear surface panel 510 may be diffused by the multi-array lens 515, and introduced into the entire pixel areas of the front surface panel 520. Further, the entire light that passed through the first pixel 510-1 of the rear surface panel 510 may pass through the front surface panel 520 by the front surface panel 520, and provided to the user.

Referring to FIGS. 5A to 5E, only three unit lenses 515-1, 515-2, 515-3 are illustrated, but the disclosure is not limited thereto, and unit lenses may be arranged in the entire areas of the rear surface panel 510. For example, FIGS. 5B and 5E are diagrams illustrating only pixel areas corresponding to the three unit lenses.

Figure 6A:
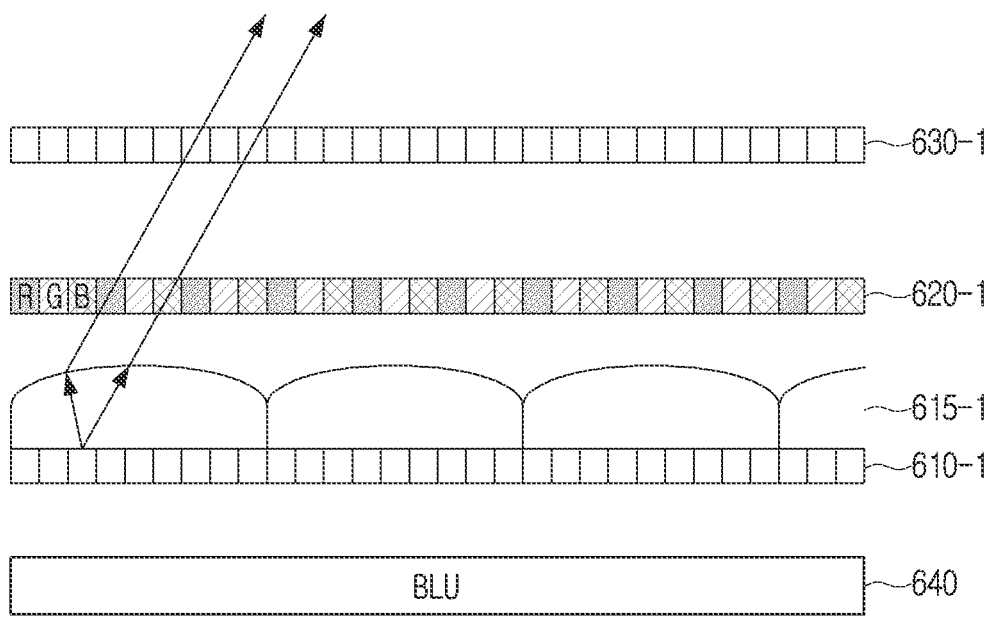
FIG. 6A is a diagram illustrating a stacked display consisting of three panels wherein a middle panel is a color panel, and a front surface panel and a rear surface panel are monochrome panels according to an embodiment of the disclosure.

FIG. 6A is a diagram illustrating a stacked display consisting of three panels and a backlight 640 wherein a middle panel is a color panel, and a front surface panel and a rear surface panel are monochrome panels according to an embodiment of the disclosure.

Referring to FIG. 6A, in the stacked display 600-1, according to an embodiment of the disclosure, the front surface panel 630-1 and the rear surface panel 610-1 may be implemented as monochrome panels, and the middle panel 620-1 may be implemented as a color panel. In addition, on the rear surface panel 610-1, the multi-array lens 615-1 may be arranged. By virtue of this, the stacked display 600-1 may provide an image without a loss of the resolution.

Figure 6B:
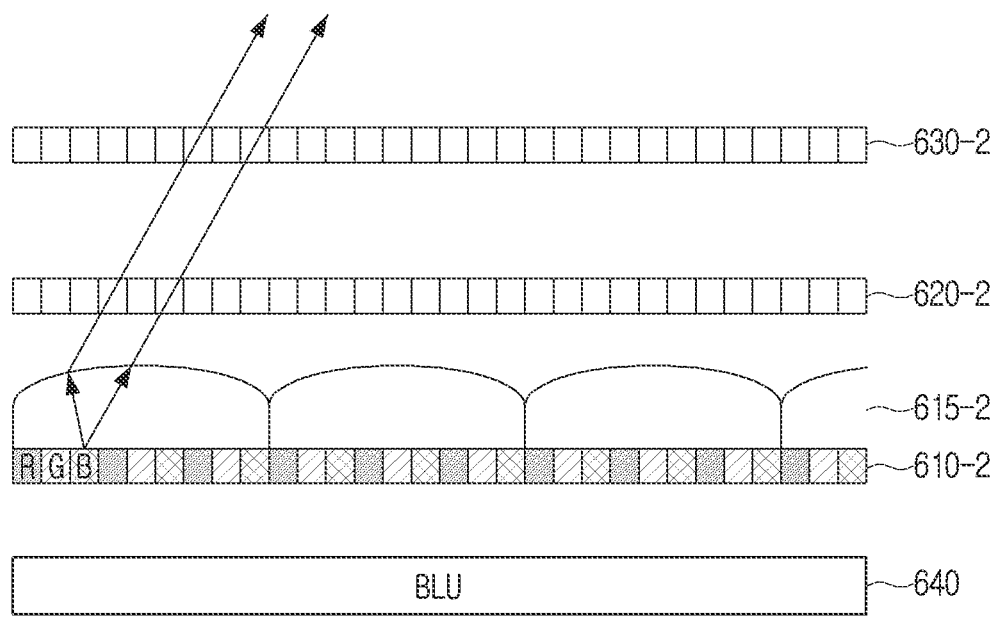
FIG. 6B is a diagram illustrating a stacked display consisting of three panels wherein a rear surface panel is a color panel, and a front surface panel and a middle panel are monochrome panels according to an embodiment of the disclosure.

FIG. 6B is a diagram illustrating a stacked display consisting of three panels and a backlight 640 wherein a rear surface panel is a color panel, and a front surface panel and a middle panel are monochrome panels according to an embodiment of the disclosure.

Referring to FIG. 6B, in the stacked display 600-2, according to an embodiment of the disclosure, the front surface panel 630-2 and the middle panel 620-2 may be implemented as monochrome panels, and the rear surface panel 610-2 may be implemented as a color panel. In addition, on the rear surface panel 610-2, the multi-array lens 615-2 may be arranged.

Figure 6C:
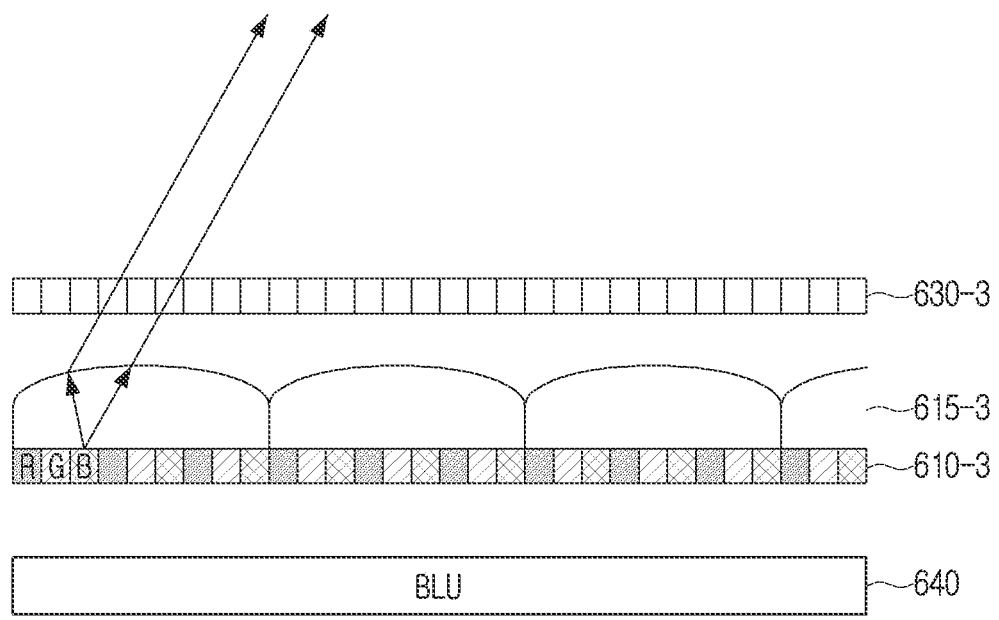
FIG. 6C is a diagram illustrating a stacked display consisting of two panels wherein a rear surface panel is a color panel, and a front surface panel is a monochrome panel according to an embodiment of the disclosure.

FIG. 6C is a diagram illustrating a stacked display consisting of two panels and a backlight 640 wherein a rear surface panel is a color panel, and a front surface panel is a monochrome panel according to an embodiment of the disclosure.

Referring to FIG. 6C, in the stacked display 600-3 according to an embodiment of the disclosure, the front surface panel 630-3 may be implemented as a monochrome panel, and the rear surface panel 610-3 may be implemented as a color panel. In addition, on the rear surface panel 610-3, the multi-array lens 615-3 may be arranged.

Figure 7:
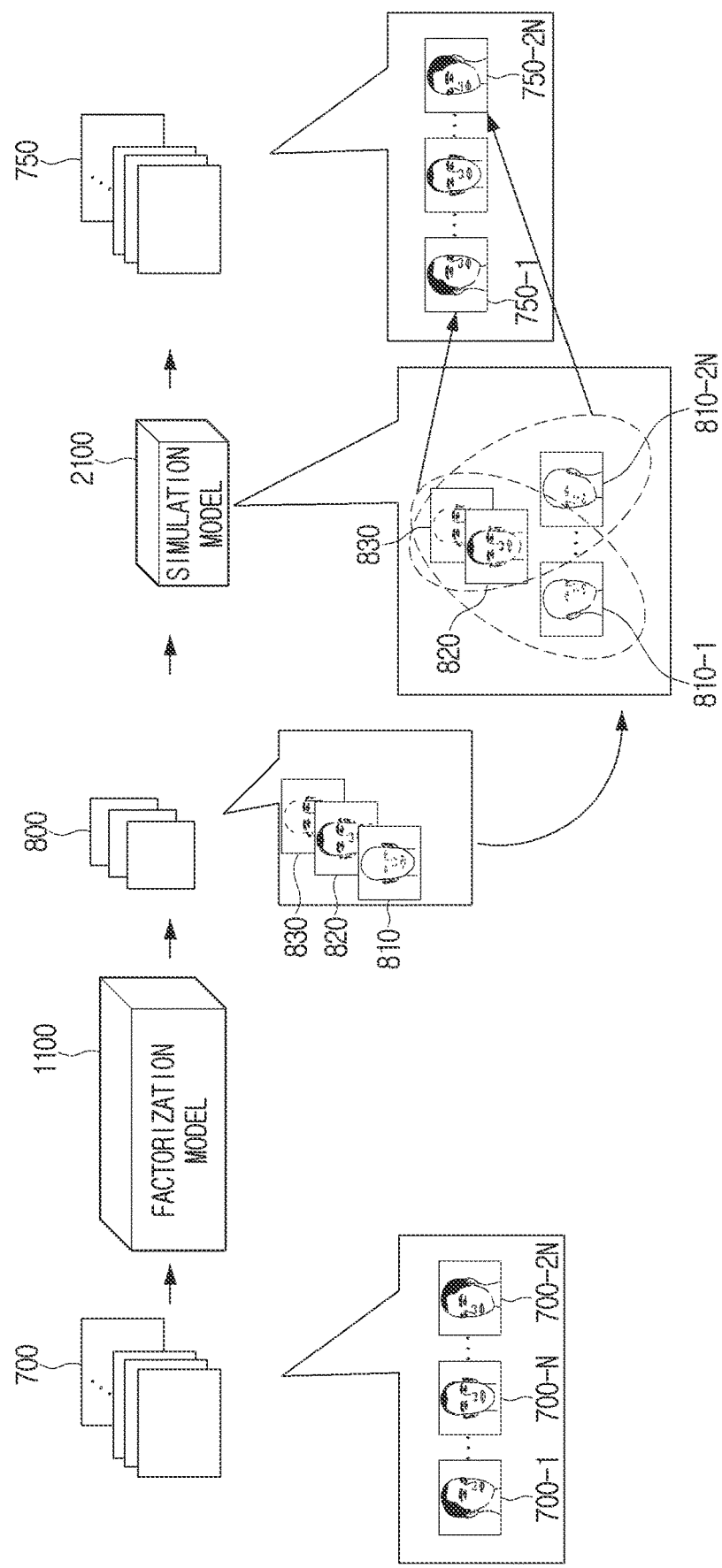
FIG. 7 is a diagram illustrating a training method of a factorization model for acquiring layer images to be displayed on each of a plurality of panels of a stacked display according to an embodiment of the disclosure.

FIG. 7 is a diagram illustrating a training method of a factorization model for acquiring layer images to be displayed on each of a plurality of panels of a stacked display according to an embodiment of the disclosure.

Referring to FIG. 7, according to an embodiment of the disclosure, the first LF images 700 may be input into the factorization model 1100, and a plurality of layer images 800 for being displayed on each of a plurality of panels of the stacked display may be acquired.

As an example, the first LF images 700 may consist of a number 2N corresponding to 1*2n views. For example, among the first LF images 700, the 1-1 LF image 700-1 may be an LF image corresponding to the first view, and it may be an image which is expressed as if an object included in the first LF images 700 is viewed in the first view (e.g., the far left side). In addition, among the first LF images 700, the 1-2N LF image 700-2N may be an LF image corresponding to the 2Nth view, and it may be an image which is expressed as if an object included in the first LF images 700 is viewed in the 2Nth view (e.g., the far right side). In addition, among the first LF images 700, the 1-N LF image 700-N may be an LF image corresponding to the Nth view, and it may be an image which is expressed as if an object included in the first LF images 700 is viewed from the center. Further, the number 2N of the first LF images may be different from the number N of rear surface panel pixels corresponding to the pitch of the lens in FIG. 1. However, the disclosure is not limited thereto, and the number of the first LF images and the number of the rear surface panel pixels corresponding to the pitch of the lens may be identical.

In addition, the factorization model 1100 may convert the first LF images 700 into three sheets of layer images 800. As an example, the factorization model 1100 may be implemented as one of a deep neural network (DNN) model, a non-negative tensor factorization (NTF) model, or a non-negative matric factorization (NMF) model, and the stacked display device 700 may train the factorization model 1100 through the process in FIG. 7, and thereby improve the performance of the factorization model 1100.

The layer images 800 are a plurality of images converted to display the plurality of first LF images 700 in different views on the stacked display device 200. For example, the factorization model 1100 may output the plurality of layer images 800 in a number corresponding to the number of the panels of the stacked display 200.

For example, as an example, in case the number of the panels of the stacked display device 200 is three, the factorization model 1100 may output three layer images 800. For example, the first layer image 810 is an image for being displayed on the rear surface panel (the first panel) of the stacked display device 200, and the second layer image 820 is an image for being displayed on the middle panel (the second panel) of the stacked display device 200. In addition, the third layer image 830 is an image for being displayed on the front surface panel (the third panel) of the stacked display device 200.

Then, the stacked display device 200 may restore the plurality of layer images 800 in an LF image format through the simulation model 2100 and acquire the second LF images 750. The second LF images 750 are images wherein the plurality of layer images 800 were restored in an LF image format for training the factorization model 1100.

Specifically, the simulation model 2100 may convert the first layer image 810 into a plurality of first view layer images 810-1, ..., 810-2N corresponding to a plurality of views. For example, the 1-1 view layer image 810-1 may be a layer image which is expressed as if an object included in the first layer image 810 is viewed in the first view (e.g., the far left side). Moreover, the 1-2N view layer image 810-2N may be a layer image which is expressed as if an object included in the first layer image 810 is viewed in the 2Nth view (e.g., the far right side).

Then, the simulation model 2100 may restore the 2-1 LF image 750-1 by using the 1-1 view layer image 810-1, the second layer image 820, and the third layer image 830. Here, the 2-1 LF image 750-1 may be an LF image which is expressed as if an object is viewed in the first view. In addition, the simulation model 2100 may restore the 2-2N LF image 750-2N by using the 1-2N view layer image 810-2N, the second layer image 820, and the third layer image 830. Here, the 2-2N LF image 750-2N may be an LF image which is expressed as if an object is viewed in the 2Nth view. Description regarding the plurality of first view layer images 810-1, ..., 810-2N corresponding to a plurality of views will be made below through FIG. 8.

Then, the stacked display device 200 may compare the restored second LF images 750 with the first LF images 700 and acquire a loss function.

The loss function is an index indicating the current learning state of the factorization model 1100, and the current learning state of the factorization model 1100 may be indicated based on the loss function. According to an embodiment of the disclosure, training of the factorization model 1100 may be performed based on the loss function as in Equation 1.

$$\min_{W,b} \sum_{i=1\ldots total\text{-}view\text{-}num} Loss(X_i - simulator(f_1, \ldots, f_{number\text{-}of\text{-}layer}))$$

Equation 1

In Equation 1, $X_i$ indicates the ith image 700-$i$ among the plurality of images included in the first LF images 700, and $f_1$ indicates the first layer image 810 among the plurality of layer images 800. Moreover, 'total-view-num' indicates the total number (e.g., 2N) of the first LF images 700, and 'number-of-layer' indicates the number of the plurality of layer images (e.g., three).

Further, simulator (f1, ... f number-of-layer) may mean the restored second LF images 750. For example, Equation 1 indicates a loss function which is a value of comparing each of the plurality of images included in the first LF images 700 with the restored second LF images 750 and computing a loss, and adding all of the each computed loss. Then, the stacked display device 200 may perform training for the factorization model 1100 in a direction that the loss function is minimized.

Then, the stacked display 200 may train the factorization model 1100 based on the loss function.

Then, the stacked display device 200 may display each of the layer images acquired through the trained factorization model on the stacked display, and a detailed content in this regard will be described below through FIG. 10.

Figure 8:
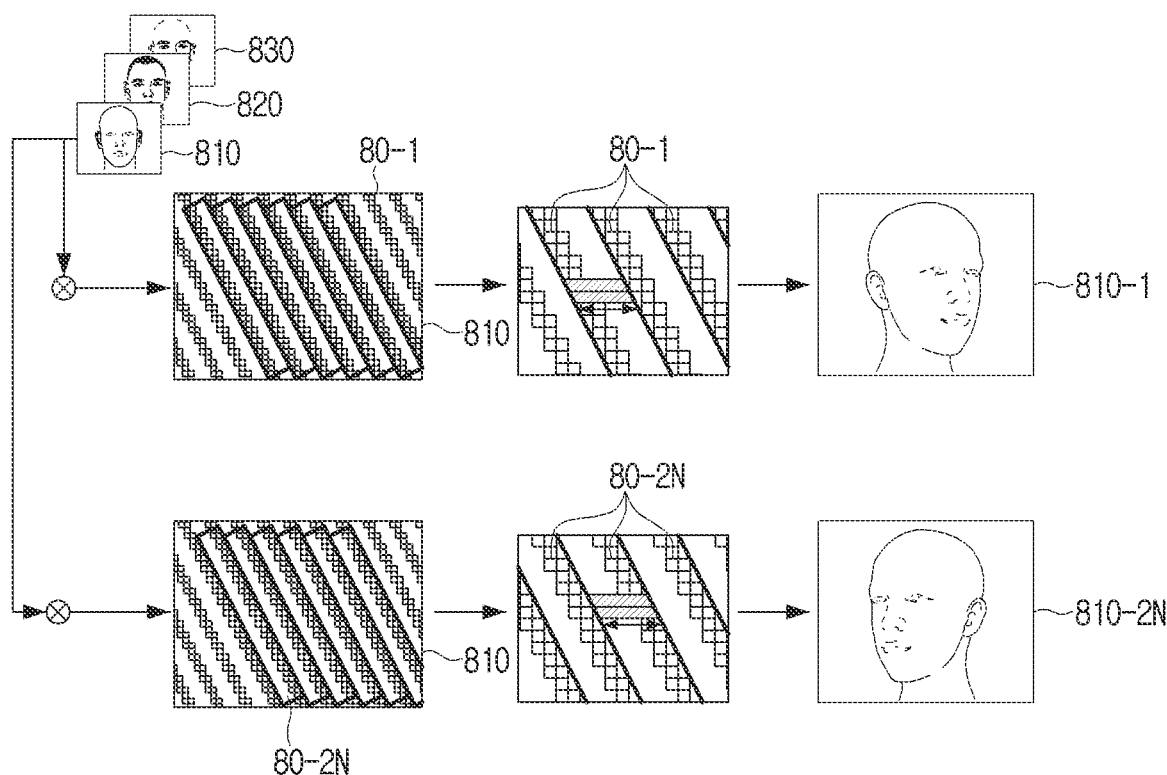
FIG. 8 is a diagram for illustrating a plurality of first view layer images wherein a first layer image to be displayed on a rear surface panel is converted to correspond to each of a plurality of views according to an embodiment of the disclosure.

FIG. 8 is a diagram for illustrating a plurality of first view layer images wherein a first layer image to be displayed on a rear surface panel is converted to correspond to each of a plurality of views according to an embodiment of the disclosure.

Referring to FIG. 8, the stacked display device 200 according to an embodiment of the disclosure may convert the first layer image 810 into a plurality of first view layer images 810-1, ..., 810-2N corresponding to a plurality of views.

Specifically, the stacked display device 200 may divide pixel areas for each view by the multi-array lens among the plurality of pixel areas included in the first layer image 810.

For example, the stacked display device 200 may enlarge the pixels of the pixel area 80-1 corresponding to the first view among the plurality of pixel areas included in the first layer image 810 as much as the pitch of the multi-array lens, and acquire the 1-1 view layer image 810-1.

Then, the stacked display device 200 may enlarge the pixels of the pixel area 80-2N corresponding to the 2Nth view among the plurality of pixel areas included in the first layer image 810 as much as the pitch of the multi-array lens, and acquire the 1-2N view layer image 810-2N.

As described above, the stacked display device 200 may acquire the plurality of first view layer images 810-1, ..., 810-2N by enlarging pixel areas corresponding to each view among the plurality of pixel areas included in the first layer image 810.

Figure 9:
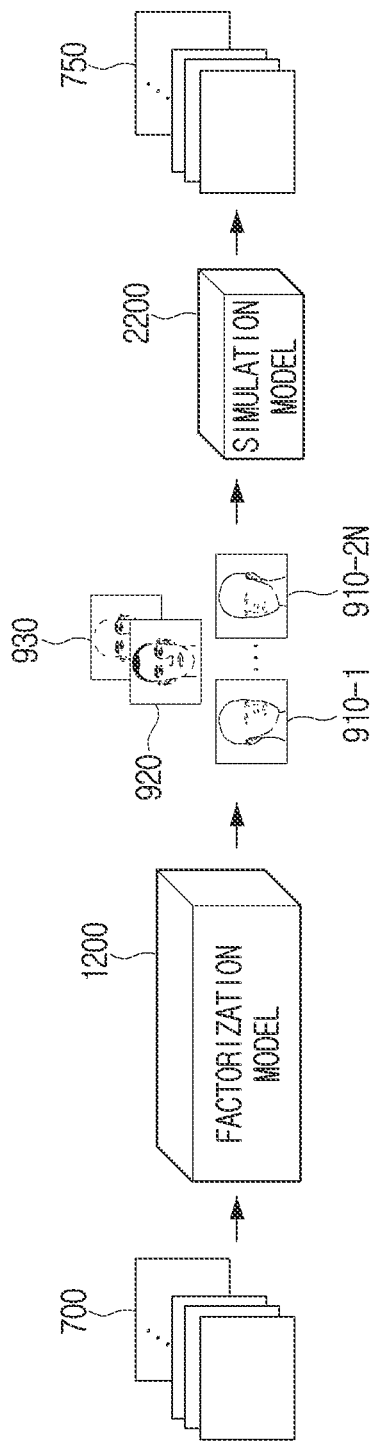
FIG. 9 is a diagram for illustrating a training method of a factorization model according to an embodiment of the disclosure.

FIG. 9 is a diagram for illustrating a training method of a factorization model according to an embodiment of the disclosure.

Referring to FIG. 7, it was described that three layer images 800 are acquired from the factorization model 1100, and the first layer image 810 is converted into the plurality of first view layer images 810-1, . . . , 810-2N in the simulation model 2100, but the disclosure is not limited thereto.

Referring to FIG. 9, the factorization model 1200 may output the plurality of first view layer images 910-1, . . . , 910-2N, the second layer image 920, and the third layer image 930.

Then, the stacked display device 200 may input the plurality of first view layer images 910-1, . . . , 910-2N, the second layer image 920, and the third layer image 930 into the simulation model 2200, and restore the second LF images 750.

Then, as described above in FIG. 7, the stacked display device 200 may acquire a loss function by using the first LF images 700 and the second LF images 750, and train the factorization model 1100 based on the loss function.

For example, according to an embodiment of the disclosure, the simulation model may convert the first layer image into a plurality of first view layer images, or a plurality of first view layer images may be output at the factorization model.

Figure 10:
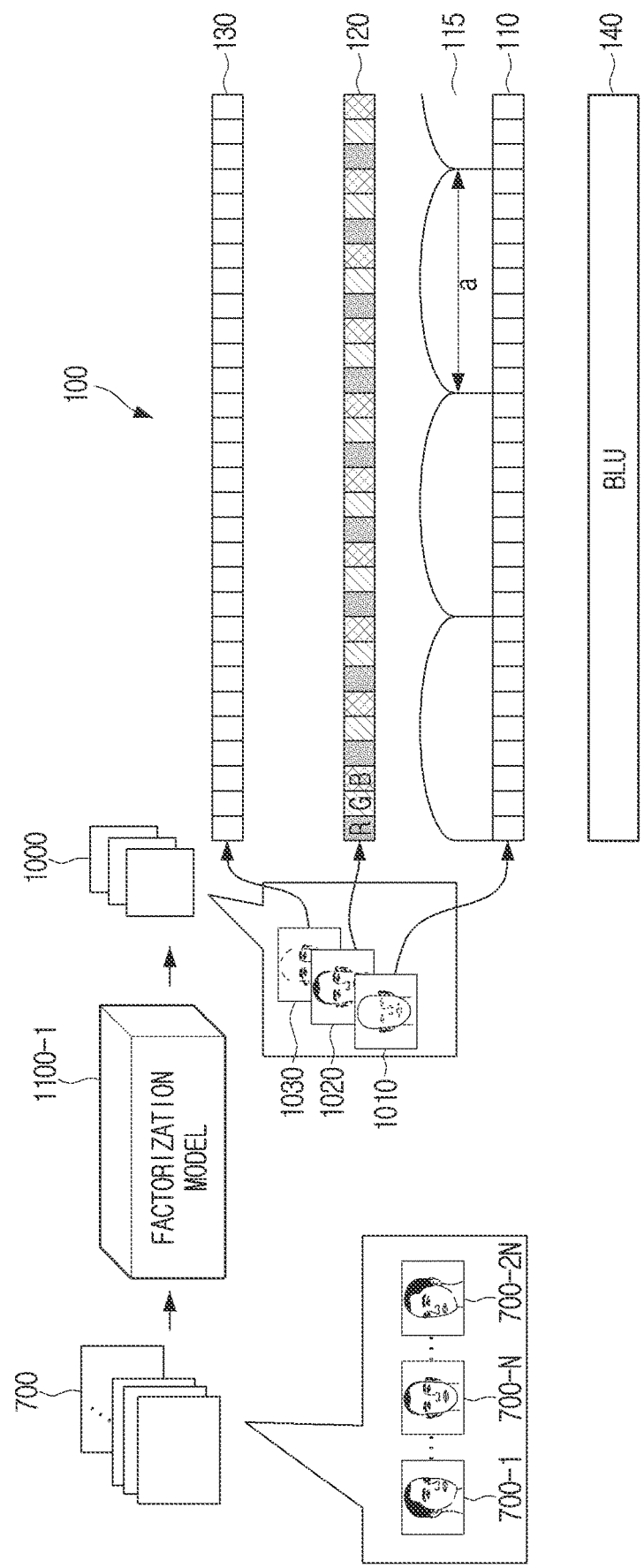
FIG. 10 is a diagram for illustrating a method of displaying a layer image acquired through a trained factorization model on a stacked display according to an embodiment of the disclosure.

FIG. 10 is a diagram for illustrating a method of displaying a layer image acquired through a trained factorization model on a stacked display according to an embodiment of the disclosure.

Referring to FIG. 10, the stacked display device 200 may input the first LF images 700 into the trained factorization model 1100-1, and acquire layer images 1000. The layer images 1000 may include a first layer image 1010 for being displayed on the first panel 110, a second layer image 1020 for being displayed on the second panel 120, and a third layer image 1030 for being displayed on the third panel 130.

Here, the trained factorization model 1100-1 may be a factorization model trained through the learning process in FIG. 7 or 9.

Then, the stacked display device 200 may, while displaying the first layer image 1010 on the first panel 110, display the second layer image 1020 on the second panel 120, and display the third layer image 1030 on the third panel 130, and thereby provide a stereoscopic image.

Figure 11:
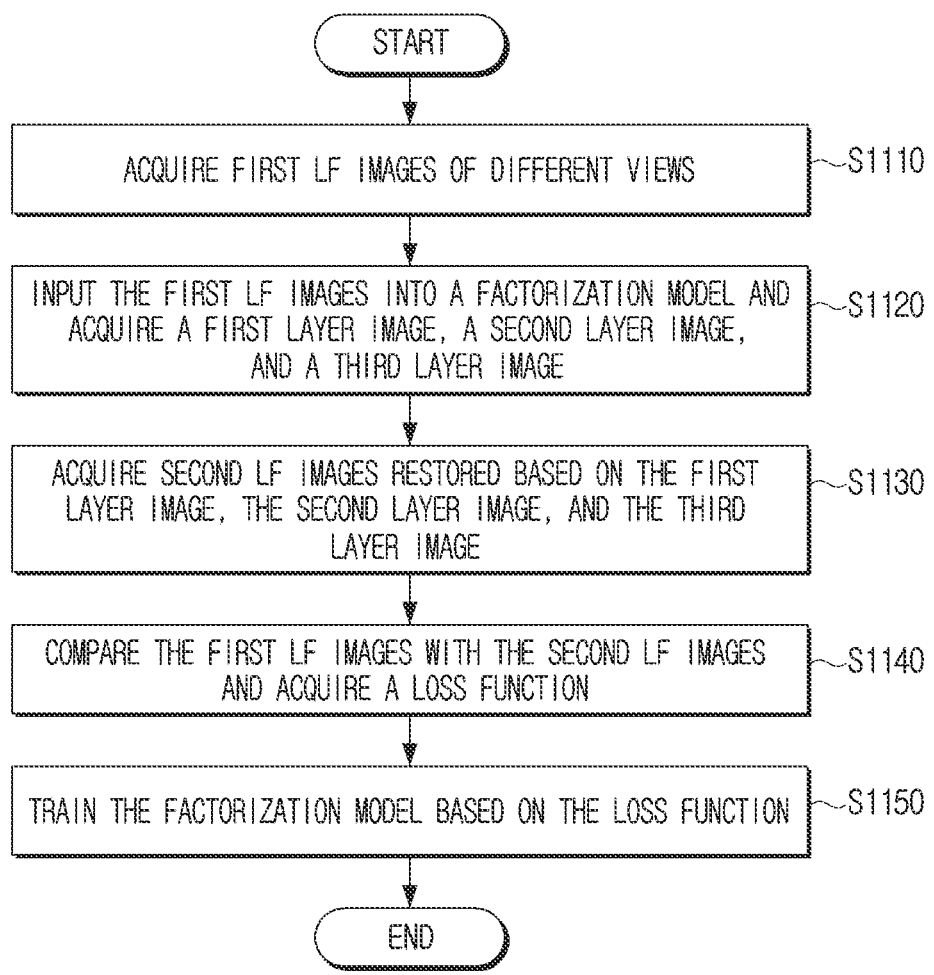
FIG. 11 is a flow chart for illustrating a control method of a stacked display device according to an embodiment of the disclosure.

FIG. 11 is a flow chart for illustrating a control method of a stacked display device according to an embodiment of the disclosure.

Referring to FIG. 11, first, the stacked display device 200 may acquire first LF images of different views in operation S1110. The stacked display device 200 according to an embodiment of the disclosure may include a first panel, a second panel, and a third panel.

Then, the stacked display device 200 may input the first LF images into the factorization model and acquire a first layer image, a second layer image, and a third layer image in operation S1120. Here, the first layer image is an image for being displayed on the first panel, the second layer image is an image for being displayed on the second panel, and the third layer image is an image for being displayed on the third panel.

In addition, on the first panel, a multi-array lens for diffusing a light may be arranged, and an image provided to a user may be different according to the user's view viewing the stacked display device 200 by the multi-array lens.

Then, the stacked display device 200 may acquire second LF images restored based on the first layer image, the second layer image, and the third layer image in operation S1130.

Here, the second LF images may be a collection of a plurality of images corresponding to a plurality of views.

Then, the stacked display device 200 may convert the first layer image to correspond to a first view, and restore an LF image corresponding to the first view among the second LF images based on the second layer image, the third layer image, and the first layer image corresponding to the first view. Specifically, the stacked display device 200 may enlarge a pixel area corresponding to the first view among the pixel areas of the first layer image as much as the pitch of the multi-array lens, and acquire the first layer image corresponding to the first view.

However, the disclosure is not limited thereto, and the stacked display device 200 may input the first LF images into the factorization model, and acquire the second layer image, the third layer image, and the plurality of first view layer images corresponding to a plurality of views. Then, the stacked display device 200 may acquire the second LF images based on the second layer image, the third layer image, and the plurality of first view layer images corresponding to a plurality of views.

Then, the stacked display device 200 may compare the first LF images with the second LF images, and acquire a loss function in operation S1140.

Then, the stacked display device 200 may train the factorization model based on the loss function in operation S1150.

Meanwhile, the various embodiments of the disclosure should be interpreted to include various modifications, equivalents, and/or alternatives of the embodiments of the disclosure. Moreover, with respect to the detailed description of the drawings, similar components may be designated by similar reference numerals.

In addition, in the disclosure, expressions such as "have," "may have," "include" and "may include" should be construed as denoting that there are such characteristics (e.g., elements such as numerical values, functions, operations, and components), and the expressions are not intended to exclude the existence of additional characteristics.

Further, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in the disclosure may be used to describe various elements regardless of any order and/or degree of importance. In addition, such expressions are used only to distinguish one element from another element, and are not intended to limit the elements.

Meanwhile, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Moreover, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Meanwhile, the term "a part" or "a module" used in the disclosure includes a unit consisting of hardware, software, or firmware, and it may be interchangeably used with terms, for example, logic, a logical block, a component, or a circuit. In addition, "a part" or "a module" may be a component consisting of an integrated body or a minimum unit performing one or more functions or a portion thereof. For example, a module may consist of an application-specific integrated circuit (ASIC).

In addition, the various embodiments of the disclosure may be implemented as software including instructions stored in machine-readable storage media, which can be read by machines (e.g., computers). The machines refer to devices that call instructions stored in a storage medium, and can operate according to the called instructions, and the devices may include a stacked display device according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Further, according to an embodiment, the method according to the various embodiments described in the disclosure may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed on-line through an application store (e.g., PlayStore™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g., a module or a program) according to the various embodiments may be comprised of a single entity or a plurality of entities, and some sub-components among the aforementioned corresponding sub-components may be omitted, or different sub-components may be further included in the various embodiments. Alternatively or additionally, some components (e.g., a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A stacked display device comprising:
   a display including a plurality of display panels; and
   a processor processing a layer image for providing an image to the display,
   wherein the display comprises:
     a backlight irradiating a light,
     a first panel, including a lens for diffusing the light irradiated from the backlight, and for displaying a first image of a first single color,
     a second panel stacked on the first panel, and including a color filter for displaying a color image, and
     a third panel stacked on the second panel, and for displaying a third image of a second single color, and
   wherein the processor is configured to:
     acquire first light field (LF) images of different views,
     input the first LF images into a factorization model for converting LF images into layer images, acquire a first layer image for displaying the first image on the first panel, a second layer image for displaying a second image on the second panel, and a third layer image for displaying the third image on the third panel,
     acquire a loss function based on the first LF images,
     train the factorization model based on the loss function, and
     control the display to, while displaying the first layer image on the first panel, display the second layer image on the second panel, and display the third layer image on the third panel.

2. The stacked display device of claim 1,
   wherein the second panel is a color panel including the color filter, and
   wherein the first panel and the third panel are monochrome panels not including color filters.

3. The stacked display device of claim 1,
   wherein the lens is a multi-array lens, and
   wherein the image provided to a user is different according to the view of the user viewing the stacked display device by the multi-array lens.

4. The stacked display device of claim 1, wherein the processor is further configured to:
   compare second LF images restored based on the first layer image, the second layer image, and the third layer image with the first LF images to acquire the loss function.

5. The stacked display device of claim 4,
   wherein the second LF images are a collection of a plurality of images corresponding to a plurality of views, and
   wherein the processor is further configured to:
     convert the first layer image to correspond to a first view and acquire a 1-1 view layer image, and restore the image corresponding to the first view among the second LF images based on the 1-1 view layer image, the second layer image, and the third layer image.

6. The stacked display device of claim 1, wherein the processor is further configured to:
acquire first light field (LF) images of different views; and
input the first LF images into the factorization model for converting the LF image into the layer image, and acquire the second layer image, the third layer image, and a plurality of first view layer images corresponding to a plurality of views.

7. The stacked display device of claim 6, wherein the processor is further configured to:
restore second LF images based on the plurality of respective first view layer images corresponding to the plurality of views, the second layer image, and the third layer image;
compare the restored second LF images with the first LF images and acquire the loss function; and
train the factorization model based on the loss function.

8. The stacked display device of claim 1,
wherein the first layer image and the third layer image are images of the first single color and the second single color, and
wherein the second layer image is a color image.

9. A method of controlling a stacked display device, the method comprising:
acquiring first light field (LF) images of different views;
inputting the first LF images into a factorization model for converting an LF image into a layer image, and acquiring a first layer image, a second layer image, and a third layer image;
acquiring second LF images restored based on the first layer image, the second layer image, and the third layer image;
acquiring a loss function by comparing the first LF images with the second LF images; and
training the factorization model based on the loss function.

10. The method of claim 9,
wherein the stacked display device includes a first panel, a second panel, and a third panel, and
wherein the first layer image is an image for being displayed on the first panel, the second layer image is an image for being displayed on the second panel, and the third layer image is an image for being displayed on the third panel.

11. The method of claim 10,
wherein, on the first panel, a multi-array lens for diffusing a light is arranged, and
wherein the image provided to a user is different according to a view of the user viewing the stacked display device by the multi-array lens.

12. The method of claim 11,
wherein the second LF images are a collection of a plurality of images corresponding to a plurality of views, and
wherein the acquiring the second LF images comprises:
acquiring a 1-1 view layer image by converting the first layer image to correspond to a first view, and
restoring an LF image corresponding to the first view among the second LF images based on the second layer image, the third layer image, and the 1-1 view layer image.

13. The method of claim 12, wherein the converting the first layer image to correspond to the first view comprises:
acquiring the 1-1 view layer image by enlarging a pixel area corresponding to the first view among the pixel areas of the first layer image as much as a pitch of a multi-array lens.

* * * * *